US008239686B1

(12) United States Patent
Hodzic et al.

(10) Patent No.: US 8,239,686 B1
(45) Date of Patent: Aug. 7, 2012

(54) METHOD AND SYSTEM FOR PROTECTING AGAINST THE EXECUTION OF UNAUTHORIZED SOFTWARE

(75) Inventors: Edin Hodzic, Pleasanton, CA (US);
Andrew M. Goodman, Portola Valley, CA (US); Prasanna Ganesan, Menlo Park, CA (US)

(73) Assignee: VUDU, Inc., Santa Clara, CA (US)

( * ) Notice: Subject to any disclaimer, the term of this patent is extended or adjusted under 35 U.S.C. 154(b) by 934 days.

(21) Appl. No.: 11/413,392

(22) Filed: Apr. 27, 2006

(51) Int. Cl.
*G06F 12/14* (2006.01)
(52) U.S. Cl. ....................................................... 713/187
(58) Field of Classification Search .......... 713/187–189, 713/193, 164–167, 176, 180, 181; 726/22, 726/26, 27, 30; 717/126, 127, 129, 131; 705/50, 51, 56; 714/37, 38, 39; 380/200–202
See application file for complete search history.

(56) References Cited

U.S. PATENT DOCUMENTS

| | | | |
|---|---|---|---|
| 4,288,659 A | 9/1981 | Atalla | |
| 4,578,530 A | 3/1986 | Zeidler | |
| 5,410,343 A | 4/1995 | Coddington et al. | |
| 5,509,120 A * | 4/1996 | Merkin et al. | 726/24 |
| 5,748,732 A | 5/1998 | Le Berre et al. | |
| 5,949,881 A | 9/1999 | Davis | |
| 6,115,816 A | 9/2000 | Davis | |
| 6,154,633 A | 11/2000 | Landgraf et al. | |
| 6,263,504 B1 | 7/2001 | Ebisawa | |
| 6,289,455 B1 | 9/2001 | Kocher et al. | |
| 6,424,714 B1 | 7/2002 | Wasilewski et al. | |
| 6,625,729 B1 * | 9/2003 | Angelo et al. | 713/2 |
| 6,687,683 B1 | 2/2004 | Harada et al. | |
| 6,715,085 B2 | 3/2004 | Foster et al. | |
| 6,804,357 B1 | 10/2004 | Ikonen et al. | |
| 6,804,719 B1 | 10/2004 | Cabrera et al. | |
| 6,961,858 B2 | 11/2005 | Fransdonk | |
| 6,993,132 B2 * | 1/2006 | Khandelwal et al. | 380/232 |
| 7,003,672 B2 * | 2/2006 | Angelo et al. | 713/189 |
| 7,027,460 B2 | 4/2006 | Iyer et al. | |
| 7,069,332 B2 | 6/2006 | Shibata et al. | |
| 7,134,138 B2 | 11/2006 | Scherr | |
| 7,168,065 B1 * | 1/2007 | Naccache et al. | 717/127 |
| 7,228,432 B2 * | 6/2007 | Angelo et al. | 713/182 |
| 7,240,345 B2 | 7/2007 | Sueyoshi et al. | |
| 7,380,276 B2 * | 5/2008 | Saha et al. | 726/22 |
| 7,440,574 B2 | 10/2008 | Hanks et al. | |
| 7,475,254 B2 | 1/2009 | Craft | |

(Continued)

OTHER PUBLICATIONS

Non-Final Office Action dated Sep. 1, 2009 for U.S. Appl. No. 11/558,872. 19 Pages.

(Continued)

*Primary Examiner* — Nirav B Patel
(74) *Attorney, Agent, or Firm* — Mahamedi Paradice Kreisman LLP

(57) ABSTRACT

In accordance with an embodiment of the present invention, a client device is protected against the execution of unauthorized software. The client includes a code authentication process that verifies the integrity of executable code, by generating and comparing a first hash value of the executable code with a known hash value of the original code. Furthermore, during boot-up, the client initializes a CPU exception vector table with one or more vector table entries. One or more, or all, of the vector table entries direct the CPU to execute the code authentication process prior to executing an event handler when an exception event occurs. Consequently, the code authentication process is virtually guaranteed to execute, thereby protecting against the execution of unauthorized code.

22 Claims, 7 Drawing Sheets

U.S. PATENT DOCUMENTS

| | | | |
|---|---|---|---|
| 7,496,756 B2 | 2/2009 | Oka et al. | |
| 7,900,060 B2 | 3/2011 | Hodzic | |
| 2002/0114465 A1 | 8/2002 | Shen-Orr et al. | |
| 2002/0154892 A1 | 10/2002 | Hoshen et al. | |
| 2002/0184489 A1 | 12/2002 | Mraz | |
| 2003/0084298 A1* | 5/2003 | Messerges et al. | 713/176 |
| 2003/0120923 A1* | 6/2003 | Gilman et al. | 713/170 |
| 2003/0208765 A1 | 11/2003 | Urdang et al. | |
| 2004/0025186 A1 | 2/2004 | Jennings et al. | |
| 2004/0039911 A1 | 2/2004 | Oka et al. | |
| 2004/0088558 A1 | 5/2004 | Candelore | |
| 2004/0093507 A1* | 5/2004 | Courcambeck et al. | 713/193 |
| 2004/0148634 A1 | 7/2004 | Arsenault et al. | |
| 2005/0015814 A1 | 1/2005 | Yun | |
| 2005/0094724 A1 | 5/2005 | Lee | |
| 2005/0108414 A1 | 5/2005 | Taylor et al. | |
| 2005/0114659 A1 | 5/2005 | Klein | |
| 2005/0117747 A1 | 6/2005 | Valenti et al. | |
| 2005/0135705 A1 | 6/2005 | Nishi | |
| 2005/0160308 A1 | 7/2005 | Elcock et al. | |
| 2005/0177853 A1 | 8/2005 | Williams et al. | |
| 2005/0210525 A1 | 9/2005 | Carle et al. | |
| 2005/0262546 A1 | 11/2005 | Murase et al. | |
| 2006/0008256 A1 | 1/2006 | Khedouri et al. | |
| 2006/0031537 A1 | 2/2006 | Boutboul et al. | |
| 2006/0078307 A1 | 4/2006 | Kelly | |
| 2006/0136597 A1 | 6/2006 | Shabtai et al. | |
| 2006/0143476 A1 | 6/2006 | McGovern | |
| 2006/0174004 A1 | 8/2006 | Asthana | |
| 2006/0190615 A1 | 8/2006 | Panwar et al. | |
| 2006/0200413 A1 | 9/2006 | Kessel et al. | |
| 2007/0016832 A1* | 1/2007 | Weiss | 714/100 |
| 2007/0101399 A1 | 5/2007 | Yun | |
| 2007/0157281 A1 | 7/2007 | Ellis et al. | |
| 2007/0245392 A1 | 10/2007 | Shen | |
| 2008/0091840 A1 | 4/2008 | Guo et al. | |
| 2008/0148323 A1 | 6/2008 | White et al. | |
| 2008/0267406 A1* | 10/2008 | Asokan et al. | 380/277 |
| 2009/0006583 A1 | 1/2009 | Kindle et al. | |
| 2009/0019131 A1 | 1/2009 | Ganesan | |
| 2009/0300673 A1 | 12/2009 | Bachet et al. | |
| 2010/0005496 A1 | 1/2010 | Ellis et al. | |
| 2010/0023976 A1 | 1/2010 | Coles et al. | |

OTHER PUBLICATIONS

Non-Final Office Action dated Aug. 6, 2009 for U.S. Appl. No. 11/357,860, 12 Pages.
Non-Final Office Action dated May 21, 2009 for U.S. Appl. No. 11/368,306, 16 Pages.
Non-Final Office Action dated Sep. 4, 2008 for U.S. Appl. No. 11/465,434, 14 Pages.
Final Office Action dated Apr. 1, 2010 for U.S. Appl. No. 11/558,872 22 pages.
Final Office Action dated Apr. 27, 2010 for U.S. Appl. No. 11/357,860. pages.
Final Office Action dated Mar. 26, 2010 for U.S. Appl. No. 11/368,306. 15 pages.
Non-Final Office Action dated Sep. 20, 2010 for U.S. Appl. No. 11/558,872 12 pages.
Final Office Action dated Mar. 19, 2009 for U.S. Appl. No. 11/465,434 18 pages.
Non-Final Office Action dated Oct. 26, 2010 for U.S. Appl. No. 11/368,306; 16 pages.
Notice of Allowance dated Oct. 28, 2010 for U.S. Appl. No. 11/357,860 30 pages.
U.S. Appl. No. 11/368,306, filed Mar. 6, 2006, Hodzic et al.
Supplemental Notice of Allowance dated Jan. 28, 2011 for U.S. Appl. No. 11/357,860.
Non-Final Office Action dated Jun. 3, 2011 for U.S. Appl. No. 11/558,872.
Final Office Action dated Dec. 27, 2011 for U.S. Appl. No. 11/558,872.

* cited by examiner

US 8,239,686 B1

METHOD AND SYSTEM FOR PROTECTING AGAINST THE EXECUTION OF UNAUTHORIZED SOFTWARE

TECHNICAL FIELD

The present invention relates generally to protecting the integrity of a trusted client, and in particular, to a method and system for protecting against the execution of unauthorized software on a trusted client.

BACKGROUND OF THE INVENTION the Internet has shown great promise as a means for delivering digital content (e.g., video and audio content, such as television shows, movies and songs). One of the advantages of network-based digital content delivery systems is the ability to deliver digital content to users on an on-demand basis (e.g., video on demand, or VOD). However, content providers have been slow to make content available via the Internet, in large part because of security concerns. Specifically, content providers fear that, once their digital content is available on the Internet, hackers will circumvent any security mechanisms used to protect their digital content and then freely distribute the content. Consequently, system developers are continuously looking for ways to secure digital content and improve the systems by which digital content is delivered over computer networks.

One of the ways that system developers attempt to secure digital content is to develop trusted clients that cannot be modified by hackers. For example, many digital content delivery systems utilize trusted clients to access, or play, digital content. One of the ways that hackers attempt to circumvent digital content security measures is to modify the trusted client device that is used to access, or play, the digital content. In particular, hackers may attempt to modify existing software, or introduce new software, on the trusted client. Accordingly, hackers may use the modified or new software processes to analyze and/or probe the trusted client in an effort to discover encryption keys, or otherwise circumvent security measures. Consequently, it is desirable to prevent the modification, or introduction of new, executable code on a client.

SUMMARY OF THE DESCRIPTION

A method and system for protecting against the execution of unauthorized software are disclosed. According to one embodiment of the invention, a client device is protected against the execution of unauthorized software. The client includes a code authentication process that verifies the integrity of executable code, by generating and comparing a hash value of the executable code with a known hash value of the authentic executable code. Furthermore, during boot-up, the client initializes a CPU exception vector table with one or more vector table entries. One or more, or all, of the vector table entries direct the CPU to execute the code authentication process prior to executing an event handler when an exception event occurs. Consequently, the code authentication process is virtually guaranteed to execute, thereby protecting against the execution of unauthorized code.

Other objects, advantages and features of the present invention will become apparent upon examining the following detailed description of an embodiment thereof, taken in conjunction with the attached drawings.

BRIEF DESCRIPTION OF THE DRAWINGS

The invention will be readily understood by reviewing the following detailed description in conjunction with the accompanying drawings, in which like references indicate similar elements and in which.

DETAILED DESCRIPTION OF THE INVENTION

A method and system for protecting against the execution of unauthorized software on a trusted client are disclosed. In the following description, for purposes of explanation, numerous specific details are set forth in order to provide a thorough understanding of the present invention. It will be evident to one skilled in the art, however, that the present invention may be practiced without these specific details. The description and representation herein are the means used by those experienced or skilled in the art to effectively convey the substance of their work to others skilled in the art. In some instances, to avoid unnecessarily obscuring aspects of the present invention, well-known operations and components have not been described in detail.

Reference herein to "one embodiment" or "an embodiment" means that a particular feature, structure, operation, or other characteristic described in connection with the embodiment may be included in at least one implementation of the invention. However, the appearance of the phrase "in one embodiment" or the phrase "in an embodiment" in various places in the specification does not necessarily refer to the same embodiment.

Figure 1:
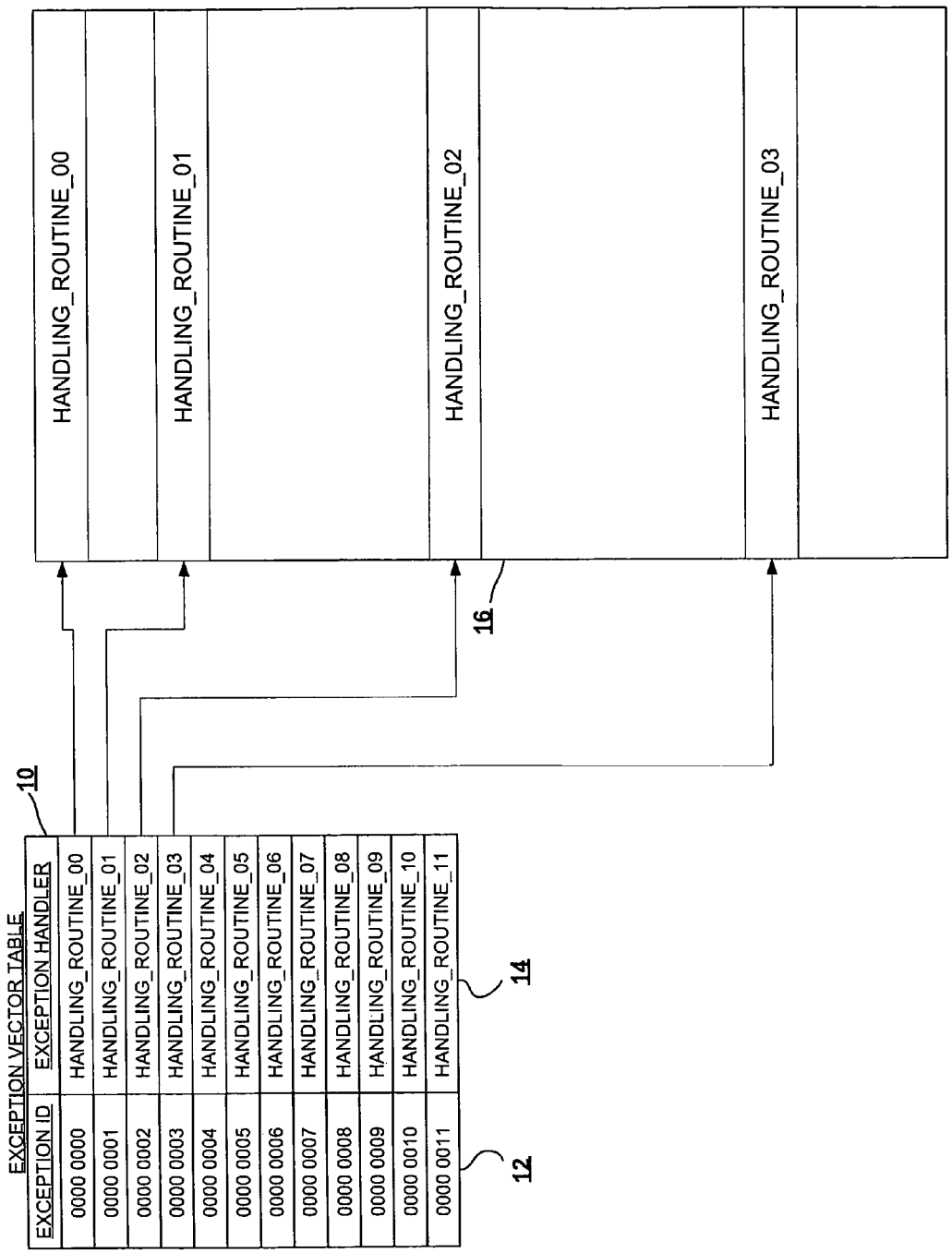
FIG. 1 illustrates a conventional CPU exception vector table.

FIG. 1 illustrates a conventional central processing unit (CPU) exception vector table 10. As illustrated in FIG. 1, the exception vector table 10 maps an exception vector identifier (ID) 12 to an exception handling routine 14. When an exception event occurs in a conventional computing system, the exception vector table 10 is referenced to determine the proper event handling routine to execute in order to process the exception event. For example, when the exception event with exception event identifier "0000_0003" occurs, the CPU executes instructions in memory 16 representing "HANDLING_ROUTINE_03." Generally, the exception vector table 10 is an essential component of the processing system. Without it, the processing system would eventually grind to a halt as exceptions occur without proper resolution.

Figure 2:
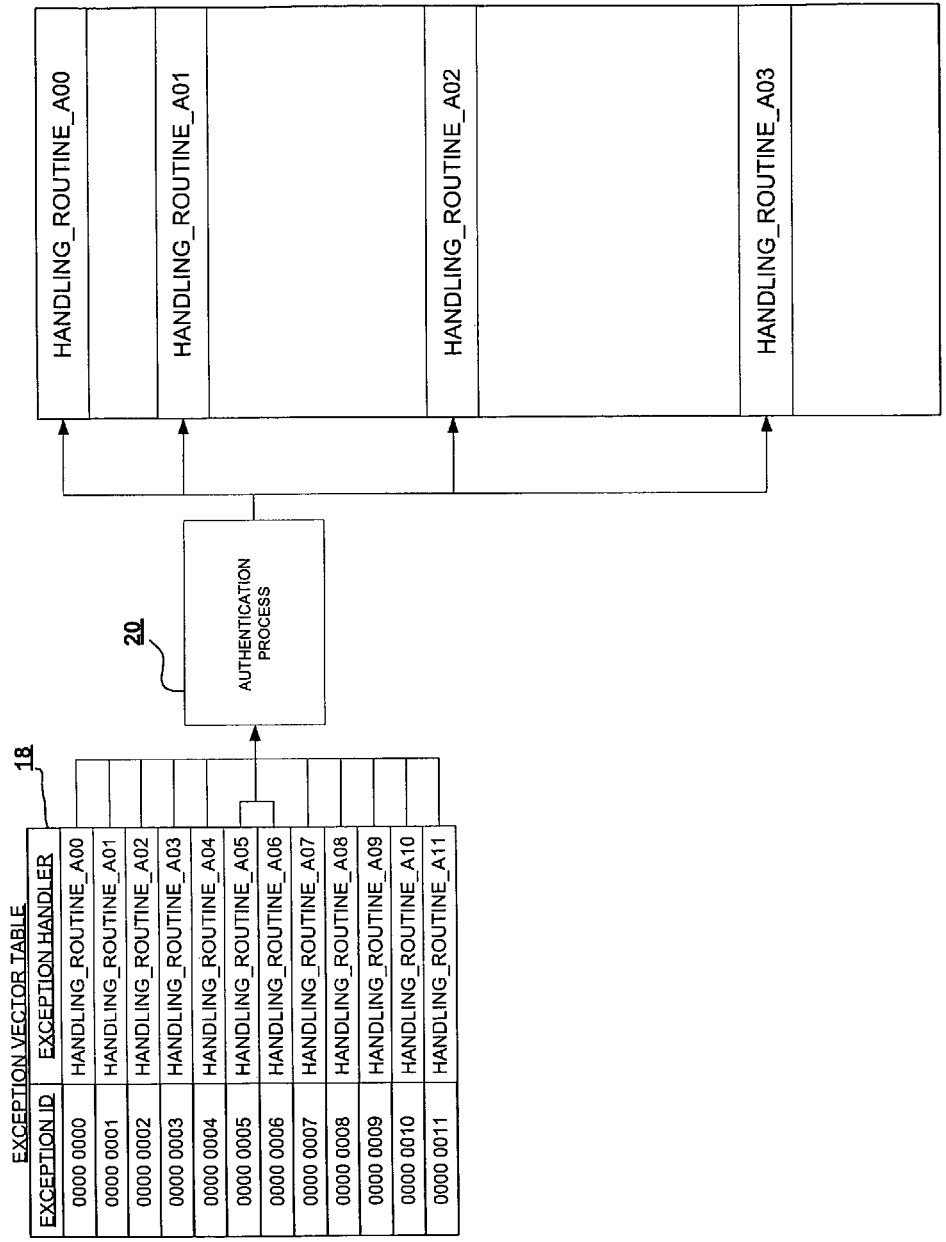
FIG. 2 illustrates a CPU exception vector table, according to an embodiment of the invention.

FIG. 2 illustrates a CPU exception vector table 18, according to an embodiment of the invention. As illustrated in FIG. 2, each entry of the exception vector table 18 causes the central processing unit (CPU) to execute a code authentication process 20 prior to executing an event handling routine associated with the particular exception vector table entry.

For example, when an exception occurs, prior to executing the event handler process that is associated with the exception event, the central processing unit (CPU) first executes software instructions associated with the code authentication process 20. If, for example, the exception event ID is "0000_0003", the CPU first executes the code authentication process, and then executes the event handling routine "HANDLING_ROUTINE_A003". This ensures that the CPU executes the code authentication process each time an exception event occurs. As proper exception handling is critical to a normally operating client, the code authentication process is virtually guaranteed to execute as exceptions occur. This makes it difficult, if not impossible, for a hacker to disable the code authentication process.

Figure 3:
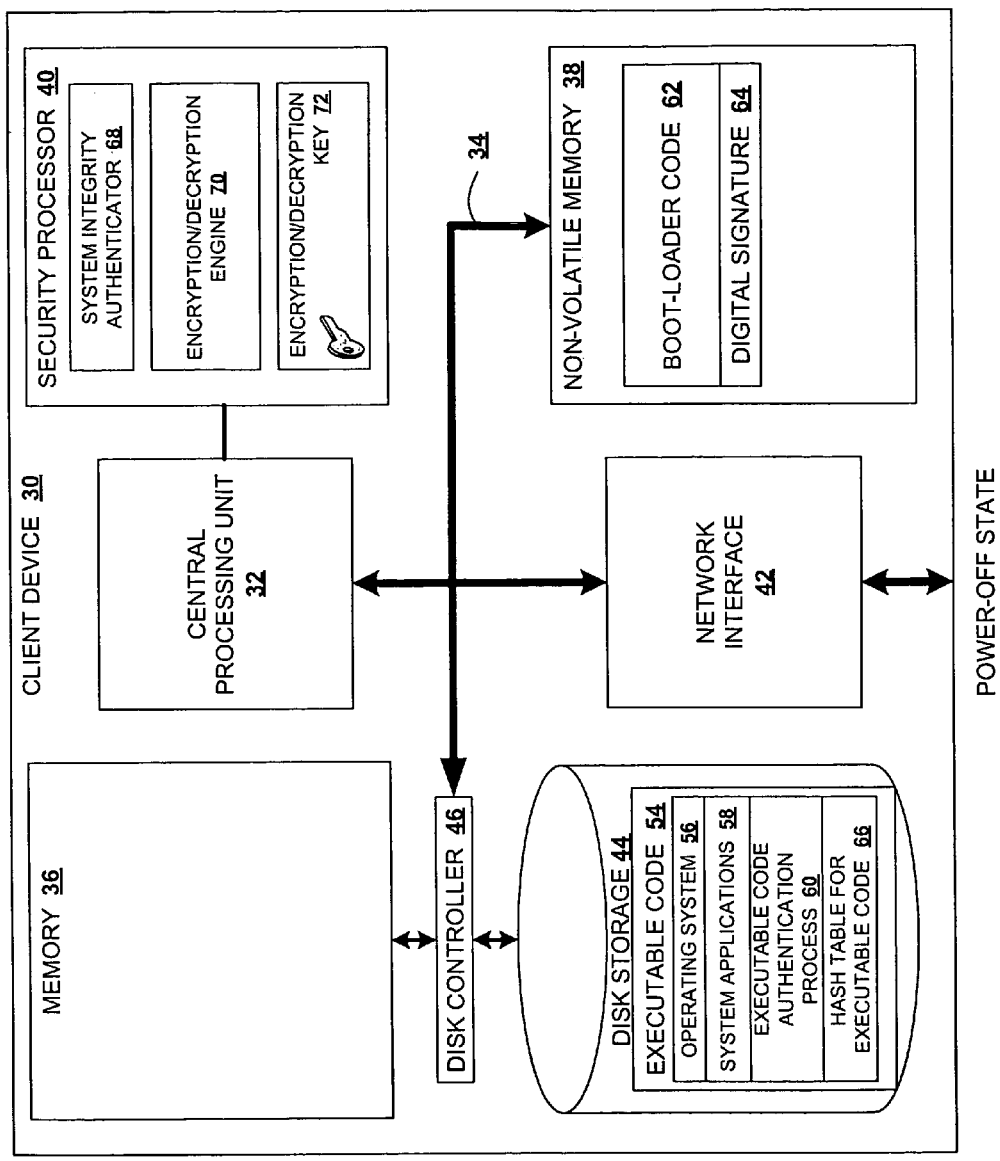
FIG. 3 illustrates a client device in a power-off state, according to one embodiment of the invention.

FIG. 3 illustrates a client device 30 in a power-off state, according to one embodiment of the invention. As illustrated in FIG. 3, the client 30 includes a central processing unit (CPU) 32, coupled by means of a system bus 34 to a memory 36, a non-volatile memory 38, a security processor (or co-processor) 40, and a network interface 42. In addition, the CPU 32 is coupled to a disk storage device 44 by means of a disk controller 46 and the system bus 34.

In one embodiment of the invention, one or more of the individual components shown in FIG. 3 may be part of a system-on-a-chip (SoC). For example, in one embodiment of the invention, the CPU 32, security processor 40, disk controller 46, memory controller (not shown), and network interface 42 may all be part of a SoC. It will be appreciated by those skilled in the art that the client device 30 may include a variety of other functional components (e.g., a display subsystem and/or an additional communication component) that are not germane to the invention, and therefore have not been included in FIG. 3.

The disk storage device 44 stores executable code 54 and a hash table for the executable code 66. In one embodiment of the invention, the executable code includes, but is not limited to the operating system 56, system applications 58, and an executable code authentication process 60. The operating system 56 may be a customized version of any conventional operating system, such as Linux or Microsoft Windows®. The system applications 58 will generally be customized applications that enable the primary functions of the client device 30, to include the play back of digital content received over the network interface 42. The executable code authentication process 60 is a set of instructions, or a process, that authenticates segments of executable code when executed by the CPU 32. As described in greater detail below, when the system powers on, segments of the executable code are read into memory to be executed by the CPU 32.

It will be appreciated by those skilled in the art that, depending on the state of the client, the executable code 54 may be a set of instructions stored on disk storage 44, or alternatively, a process stored in memory and being executed by the CPU. Furthermore, although the disk storage 44 is shown in FIG. 3 to include only executable code, it will be appreciated that a portion of disk storage may be utilized to store digital content (e.g., video and/or audio) as well.

The non-volatile memory 38 includes boot-loader code 62, and a digital signature 64 for the boot-loader code 64. The boot-loader code 62 includes boot-up instructions that are executed during a power-on procedure, which enables the client to load the operating system and enter into an operating state. As described in greater detail below, the boot-loader digital signature 64 is a mechanism used for authenticating the boot-loader code 62. Accordingly, the authentication mechanism is intended to identify non-conforming or unauthorized code before it is executed, thereby preventing hackers from modifying existing code, and/or introducing new code into the client.

In one embodiment of the invention, during production of the client 30, the executable code 54 that is to be written to the disk storage device 44 is loaded on to a production server. On the production server, the executable code 54 is analyzed, and a hash generator algorithm is utilized to generate a table 66 of hash values corresponding to segments of the executable code. Accordingly, each hash value in the hash table 66 represents a digest of a segment of executable code. Similarly, one or more hash values are generated for the boot-loader code 62. In one embodiment of the invention, the hash value for the boot-loader code is encrypted with an encryption key to generate a digital signature 64. For example, the encryption key utilized to encrypt the hash value for the boot-loader code may be shared in common with the security processor 40. Accordingly, the security processor 40, utilizing the encryption/decryption key 72, can decrypt the digital signature to access the originally generated hash for the boot-loader code 62.

During production of the client, the boot-loader code 62 and the digital signature 64, are programmed into the non-volatile memory 38. In addition, the hash table is stored in a file on the hard disk. Consequently, after production when the client is in use, the system integrity authenticator 68 can authenticate the boot-loader code 62 during a power-on, or boot-up, procedure. Similarly, after boot-up, the executable code authentication process 60 can authenticate the executable code 54 by generating a hash value with the same hash generating algorithm used on the production server. The generated hash value is then compared with the pre-calculated hash value in the hash table 66. If the hash values match, it can be presumed that the segment of executable code is authentic and original.

The security processor 40, which includes the system integrity authenticator 48, also includes an encryption/decryption engine 70 and at least one encryption/decryption key 72. Accordingly, the security processor 40 may provide the client 30 with a wide variety of security functions or services. In one embodiment of the invention, the security processor 40 provides processing power for encryption/decryption tasks that are computationally intensive. For example, encrypted digital content received via the network interface 42 may be decrypted by the encryption/decryption engine 50, in real time, before being provided to the display subsystem (not shown) for display to a user. Accordingly, in various embodiments of the invention, the security processor 40 may have any number of secret keys in addition to the encryption/decryption key 72, and each key may serve a different purpose.

Figure 4:
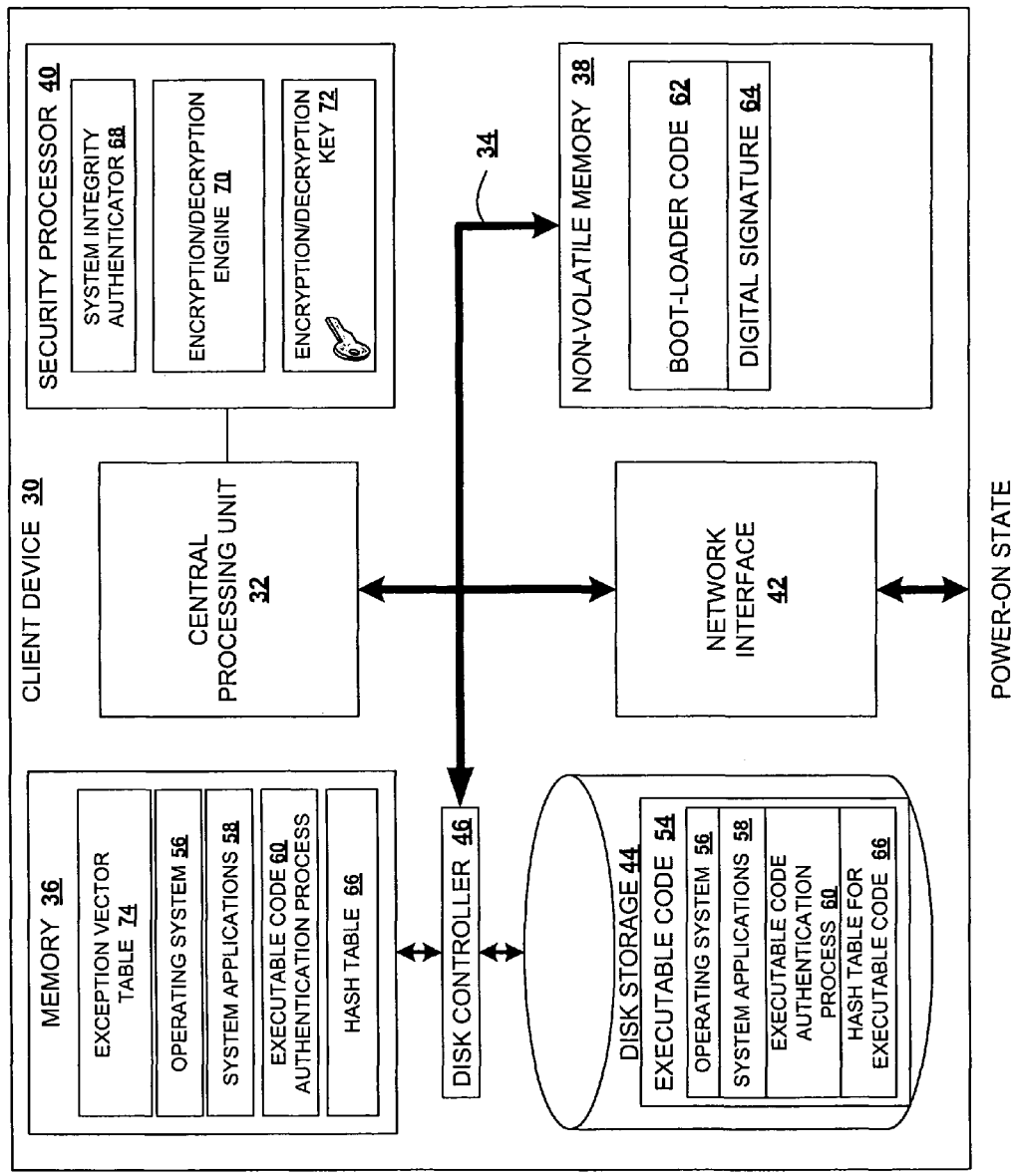
FIG. 4 illustrates a client device in a power-on state, according to one embodiment of the invention.

FIG. 4 illustrates a client device 30 in a power-on state, according to one embodiment of the invention. The client device 30 is designed such that, when it is initially powered on, the CPU is held in the RESET state, and prevented from operating. Accordingly, at power-on, the security processor 40 is enabled. Specifically, the system integrity authenticator 68 is enabled to perform an authentication operation on the boot-loader code 62. In one embodiment of the invention, the system integrity authenticator 68 authenticates the boot-loader code by comparing a first hash, generated during the power-on procedure, with a second hash, generated during production and programmed into the non-volatile memory after being encrypted with an encryption key For example, the system integrity authenticator 68 generates a hash value for the boot-loader code by analyzing the boot-loader code 62 in the non-volatile memory 38. In addition, the system integrity authenticator 68 reads the boot-loader code digital signature 64. After reading the digital signature 64, the system integrity authenticator 68 utilizes the encryption/decryption key 72 to decrypt the digital signature 64, resulting in the original hash value for the boot-loader code 62 that was generated at the production server. If the two hash values match, it is presumed that the boot-loader code 62 has not been tampered with or changed since being programmed into the non-volatile memory during production. Accordingly, the security processor 40 then enables the CPU to access the boot-loader code 62, and begin the boot-up procedure.

During the boot-up procedure, the operating system 56, or a portion thereof, is loaded into the memory 36 in accordance with the boot-loader instructions 62. In addition, an exception vector table 74 is generated and loaded into the memory 36, along with system applications 58, or a portion of, the executable code authentication process 60 and the hash table 66. Before loading the operating system and the application code, the boot loader also verifies that those files are authentic by checking their signatures.

In one embodiment of the invention, the exception vector table 74 causes the CPU to switch contexts, and execute the executable code authentication process 60, when an exception event occurs. As described in connection with FIG. 2, when a particular exception event occurs, the exception vector table is referenced to determine the proper event handling routine to be executed to process the exception event. However, prior to processing the exception event, the exception vector table directs the CPU to execute the code authentication process. Because the operational "health" of the client is dependent upon the proper processing and handling of exception events, associating the code authentication process with the exception vector tables virtually guarantees that the code authentication process 60 will be executed. This ensures that a hacker is not able to disable, or otherwise render the code authentication process 60 inoperative.

In one embodiment of the invention, the code authentication process 60 generates a hash value for a segment of executable code in memory, and then compares the hash value with a pre-calculated hash value from the hash table for that particular segment of executable code. Assuming the hash values match, it is assumed that the executable code is authentic. However, if the hash values do not match, it is presumed that the executable code is not authentic. In one embodiment of the invention, when unauthentic code is discovered, the code authentication process may cause the client to halt executing all together. Additionally, or alternatively, the code authentication process 60 may report the discovery of unauthentic code to a server.

In one embodiment of the invention, the code authentication process may maintain status information indicating which segments of code have been authenticated, as well as information relating to the time at which segments were authenticated. Accordingly, the code authentication process 60 may control how frequently it operates by determining whether executable code in memory 36 needs to be authenticated based on the status information it maintains. For example, if all of the executable code in memory 36 has recently been authenticated, the code authentication process 60 may not operate, thereby passing control to the exception handling routine associated with the exception event that initially triggered the execution of the code authentication process 60. Or, if the code authentication process has consumed too much CPU recently, it may decide not to check and just pass control onto the event handler.

In one embodiment of the invention, in addition to authenticating the boot-loader code at boot-up time, the system integrity authenticator 68 of the security processor 40 systematically authenticates the exception vector table, code authentication process 60 and the hash table 66. For example, the system integrity authenticator 68 may generate a hash value based on the hash table, and compare that hash value to a previously generated hash value. The previously generated hash value for the hash table may be a special hash value that is stored in the non-volatile memory, or in the security processor. In this manner, the system integrity authenticator can verify the authenticity of the hash table that is used to authenticate the executable code. Similarly, the system integrity authenticator may authenticate the code for the code authentication process 60, or the exception vector table 74.

Although the hash table 66 is shown in FIGS. 3 and 4 to reside on the disk storage 44, it will be appreciated by those skilled in the art that the hash table 66 may be programmed into the non-volatile memory 38. Alternatively, the hash table 66 may reside in a portion of memory (not shown) in the security processor. In addition, the hash table 66 may be encrypted with an encryption key (e.g., such as encryption key 72), such that the security processor is to decrypt the hash table prior to it being used by the code authentication process 60.

Figure 5:
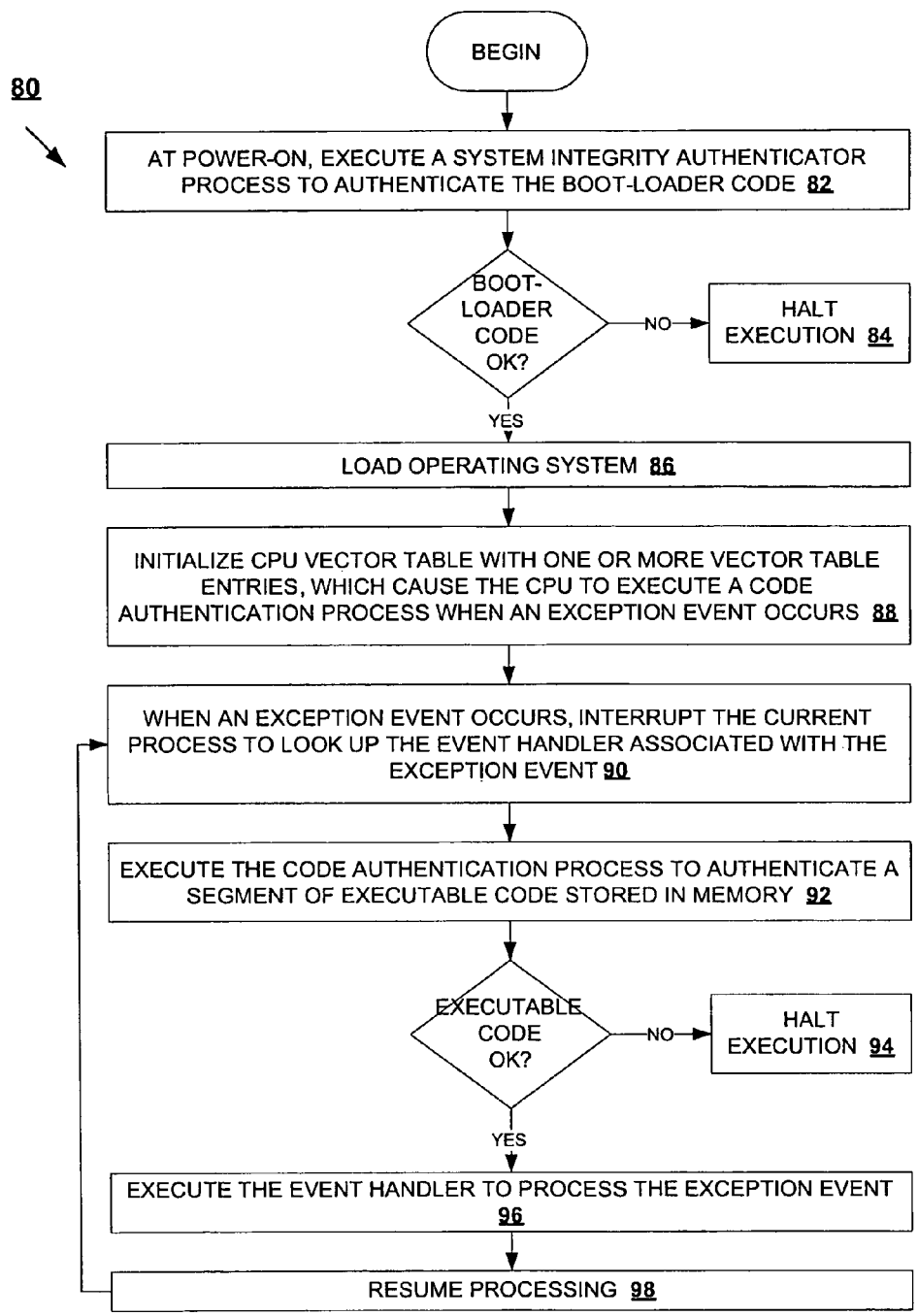
FIG. 5 illustrates a method, according to an embodiment of the invention, for protecting against the execution of unauthorized software.

FIG. 5 illustrates a method 80, according to an embodiment of the invention, for protecting against the execution of unauthorized code on a client device. At operation 82, the client device 30 is powered on, and the system integrity authenticator 82 performs an authentication operation to authenticate the boot-loader code 62. For example, the system integrity authenticator 68 may verify that a hash generated based on the boot-loader code stored in memory 38 is consistent with a digital signature 64 for the boot-loader code 62. If the boot-loader code 62 is determined not to be authentic, then the client halts execution 84, and does not boot-up. However, if the boot-loader code checks out as authentic, then at operation 86, the client loads the operating system into memory according to the instructions of the boot-loader code 62.

During the boot-up procedure, boot loader transfers control to the kernel of the operating system, and the operating system boot-up proceeds. At operation 88, the client initializes a CPU vector table with one or more vector table entries, which cause the CPU to execute a code authentication process when an exception event occurs, prior to executing the operating system's exception handling routine associated with the exception event. Accordingly, at operation 90, when an exception event occurs, the CPU interrupts the current process to lookup the event handling routine associated with the exception event. At operation 92, the code authentication process is executed to authenticate a segment of executable code in memory. If the executable code is not authentic, the client halts execution at operation 94. However, if the executable code is authentic, then the event handling routine for the exception event is executed at operation 96, after which the normal activities of the operating system including execution of the application code resume in block 98.

Figure 6:
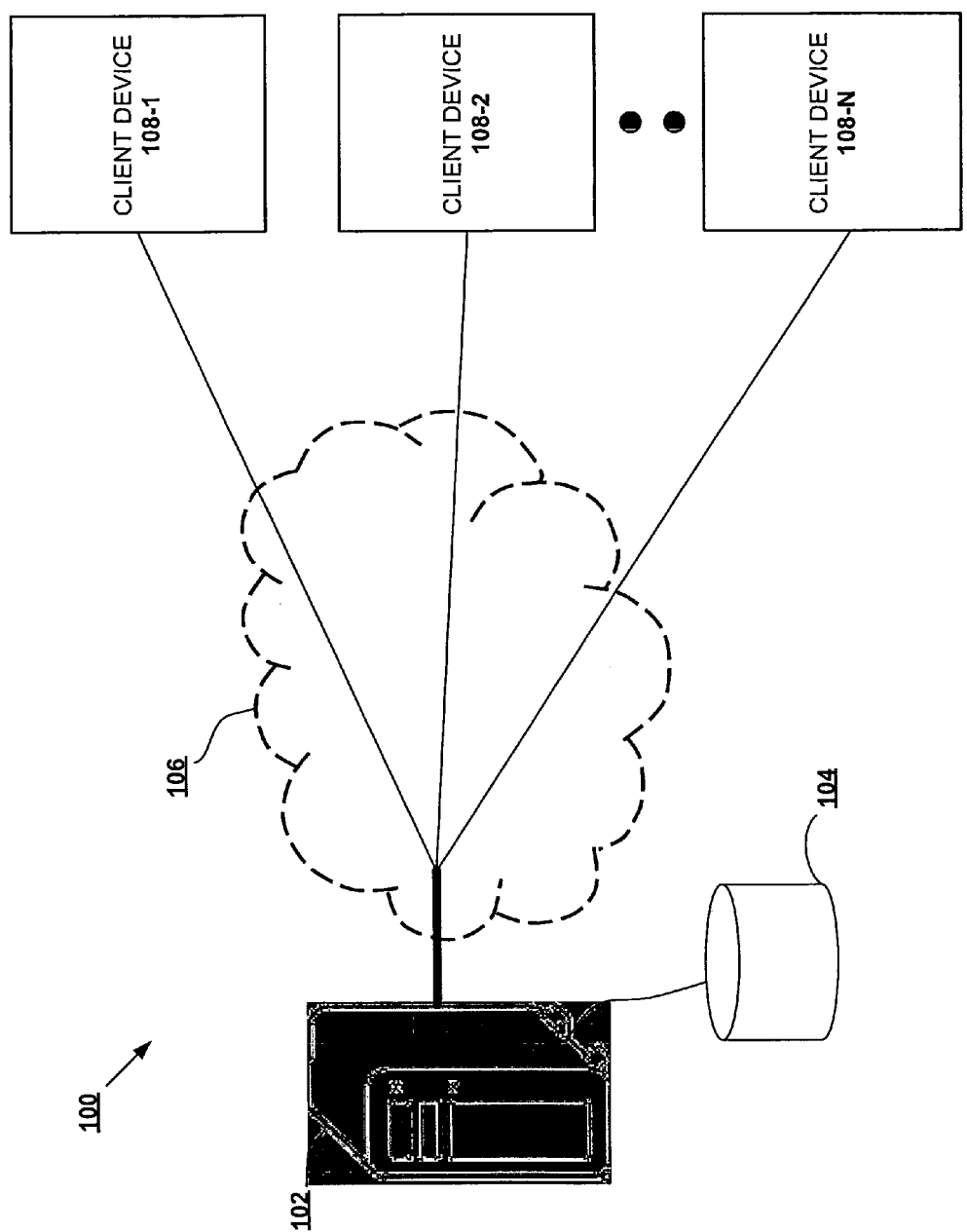
FIG. 6 illustrates a client-server based digital content delivery system, in which a client device according to an embodiment of the invention may be utilized.

FIG. 6 illustrates a client-server based digital content delivery system 100, in which a client device 108 according to an embodiment of the invention may be utilized. The digital content delivery system 100 of FIG. 1 includes a digital content server 102 with a mass storage device 104 for storing digital content. The digital content server 102 is coupled by means of a network 106 to multiple client devices 108-1, 108-2 and 108-n. In operation, a particular client device 108-1 may communicate a request for a particular title (e.g., movie), or other digital content, to the content server 102. In response, the content server 102 reads the digital content from the mass storage device 104, encrypts the digital content with an encryption key, and then communicates the digital content over the network 106 to the requesting client device 108-1. Upon receiving the encrypted digital content, the client device 108-1 executes a procedure for decrypting the digital content and then displaying the digital content to the user.

Figure 7:
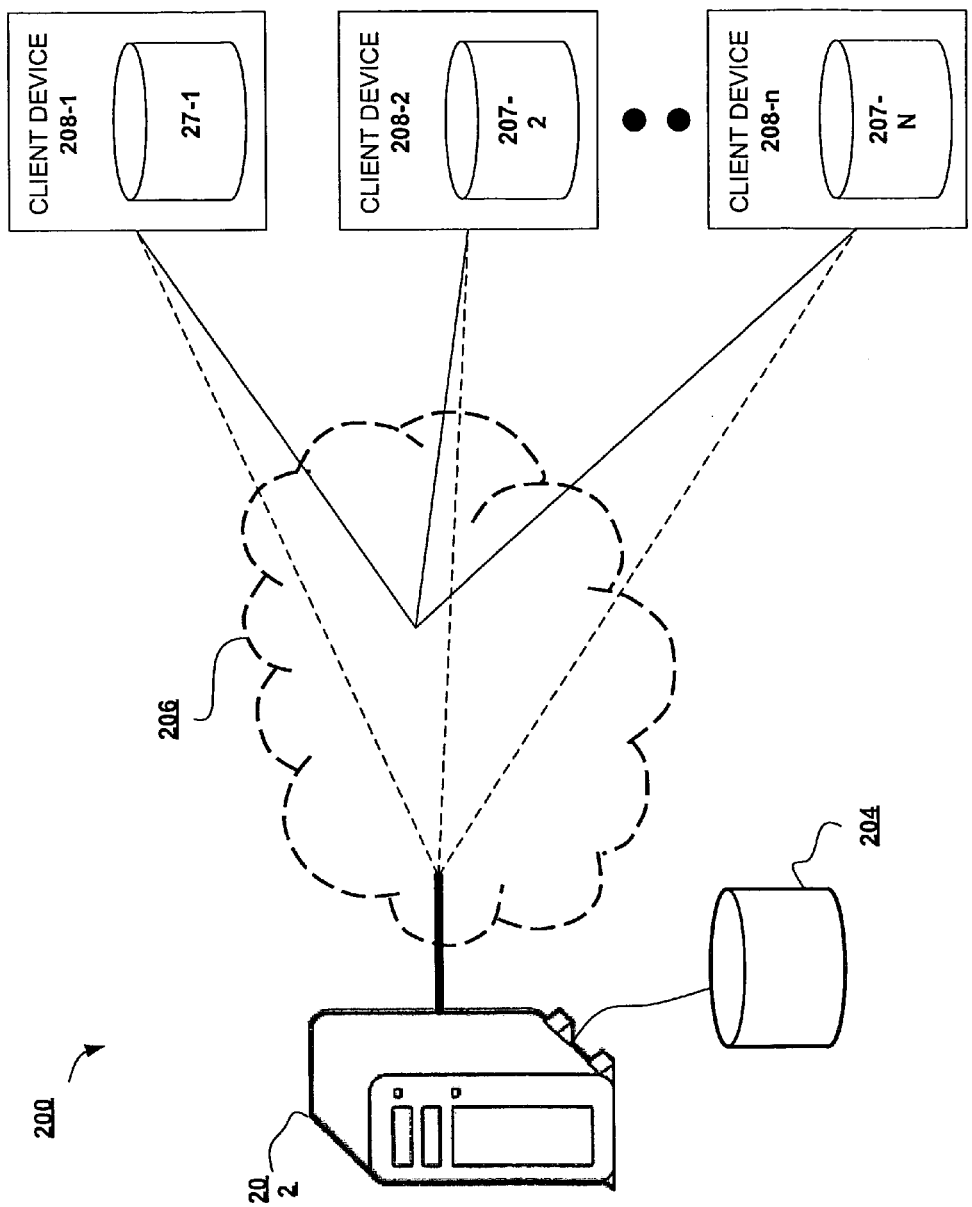
FIG. 7 illustrates a distributed peer-to-peer digital content delivery system, in which a client device according to an embodiment of the invention may be utilized.

FIG. 7 illustrates a distributed digital content delivery system 200, in which a client device according to an embodiment of the invention may be utilized. In contrast to the client-server based system 100 of FIG. 1, the system of FIG. 2 is a distributed system. For example, the digital content is stored not only on the mass storage device 204 of the content server 202, but also on the storage devices 207-1, 207-2 and 207-*n* of each individual client device 208-1, 208-2 and 208-N. Consequently, when a particular client device 208-1 makes a request for a particular title, the digital content server 202 manages the delivery process, but the actual data is communicated to the requesting client 208-1 over the network 206 from other client devices (e.g., client devices 208-2 through 208-N). This distributed delivery system, which may be thought of as a hybrid of a client-server and peer-to-peer delivery system, is more completely described in U.S. patent application Ser. No. 11/269,462 filed on Nov. 7, 2005, and assigned to WOND, Inc.

The content delivery systems illustrated in FIG. 6 and FIG. 7 are provided as two examples of systems in which the client device, according to an embodiment of the invention, may be utilized. However, it will be appreciated by those skilled in the art that the present invention may be applicable to a wide variety of client devices and content delivery systems in addition to those illustrated in FIG. 6 and FIG. 7. Furthermore, consistent with the invention, the client device may be implemented in one of many possible form factors, including (but not limited to): a set-top box, a handheld player, a mobile phone, a personal digital assistant, or a game playing device.

Thus, a method and system for protecting against the execution of unauthorized software on a client device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
   initializing a central processing unit (CPU) exception vector table of a client with one or more vector table entries, each of the one or more vector table entries referencing a corresponding event handler that is used to process an exception event, wherein at least one vector table entry directs a CPU of the client to execute a code authentication process, the code authentication process being performed every time an exception event occurs on the client;
   in response to detecting an exception event associated with the at least one vector table entry, executing the code authentication process to authenticate a segment of executable code stored in memory, wherein the code authentication process identifies non-conforming or unauthorized code before the non-conforming or unauthorized code is executed; and
   in response to the code authentication process determining that the segment of executable code is conforming or authorized code, executing an event handler associated with the at least one vector table entry;
   wherein the code authentication process authenticates the segment of executable code by calculating a first hash value for a portion of executable code stored in memory, and then, determining whether the first hash value matches a second hash value read from a table of hash values.

2. The computer-implemented method of claim 1, wherein the table of hash values is generated by a production server and written to the client during production of the client, and the table of hash values includes hash values calculated for a plurality of segments of executable code.

3. The computer-implemented method of claim 1, further comprising:
   during a power-on procedure, executing a system integrity authenticator to authenticate boot-loader code stored in a non-volatile memory, wherein the boot-loader code, when executed by the CPU, causes the client to i) load an operating system into memory and ii) initialize said CPU exception vector table.

4. The computer-implemented method of claim 1, further comprising:
   during a power-on procedure, executing a system integrity authenticator to authenticate boot-loader code stored in a non-volatile memory, wherein the boot-loader code, when executed by the CPU, causes the client to load an operating system into memory and said operating system initializes said CPU exception vector table.

5. The computer-implemented method of claim 4, wherein the system integrity authenticator is executed by a security processor so as to prevent the CPU from executing the boot-loader code until the system integrity authenticator has verified the integrity of the boot-loader code.

6. The computer-implemented method of claim 4, wherein the system integrity authenticator verifies the integrity of the boot-loader code by calculating a first hash value for boot-loader code stored in memory, and then, determining whether the first hash value matches a second hash value, wherein the second hash value is programmed into a non-volatile memory with the boot-loader code during production of the client.

7. The computer-implemented method of claim 4, wherein the system integrity authenticator verifies the integrity of the boot-loader code by reading a digital signature for the boot-loader code from memory, and decrypting the digital signature to obtain a first hash value, and then comparing the first hash value with a second hash value generated by analyzing the boot-loader code in memory.

8. The computer-implemented method of claim 7, wherein the digital signature is decrypted with a key that is known only to a security processor executing the integrity authenticator.

9. The computer-implemented method of claim 8, wherein the digital signature is generated by (i) generating the first hash value by analyzing the boot-loader code on a production server during production of the client, (ii) encrypting the first hash value with a copy of the key that is known only to the security processor executing the integrity authenticator, and (iii) programming the digital signature into a non-volatile memory along with the boot-loader code.

10. The computer-implemented method of claim 8, wherein the digital signature is generated by (i) generating the first hash value by analyzing the boot-loader code, and (ii) computing the digital signature as a function of the first hash value and a secret key, such that, the digital signature can be verified only by an entity with access to the secret key.

11. The computer-implemented method of claim 4, wherein the system integrity authenticator periodically authenticates code corresponding to the executable code authentication process so as to ensure that the code corresponding to the code authentication process has not been modified since being loaded onto the client.

12. The computer-implemented method of claim 4, wherein the system integrity authenticator periodically authenticates a table of hash values so as to ensure that the table of hash values has not been modified since being loaded onto the client.

13. A client comprising:
a central processing unit (CPU);
a security processor; and
a memory device storing boot-loader instructions, which, when executed, causes the client to:
  (i) initialize a CPU exception vector table with one or more vector table entries, each of the one or more vector table entries referencing a corresponding event handler that is used to process an exception event, wherein at least one vector table entry directs the CPU to execute a code authentication process, the code authentication Process being performed every time an exception event occurs on the client;
  (ii) in response to detecting an exception event associated with the at least one vector table entry, execute the code authentication process to authenticate a segment of executable code stored in memory, wherein the code authentication process identifies non-conforming or unauthorized code before the non-conforming or unauthorized code is executed; and
  (iii) in response to the code authentication process determining that the segment of executable code is conforming or authorized code, executing an event handler associated with the at least one vector table entry;
  wherein the code authentication process authenticates the segment of executable code by calculating a first hash value for a portion of executable code stored in memory, and then, determining whether the first hash value matches a second hash value read from a table of hash values.

14. The client of claim 13, wherein, the segment of executable code stored in memory corresponds to boot-loader instructions stored in memory.

15. The client of claim 14, wherein the security processor includes a system integrity authenticator, and during a power-on procedure, the system integrity authenticator is to authenticate the boot-loader instructions stored in the memory, wherein the boot-loader instructions, when executed by the CPU, cause the client to (i) load an operating system into memory, and (ii) initialize said CPU exception vector table.

16. The client of claim 15, wherein the system integrity authenticator verifies the integrity of the boot-loader instructions by reading a digital signature for the boot-loader instructions from memory, and decrypting the digital signature to obtain the first hash value, and then comparing the first hash value with the second hash value generated by analyzing the boot-loader instructions in memory.

17. The client of claim 16, wherein the digital signature is generated by (i) generating the first hash value by analyzing the boot-loader instructions on a production server during production of the client, (ii) encrypting the first hash value with a copy of a key that is known only to the security processor executing the integrity authenticator, and (iii) programming the digital signature into the memory along with the boot-loader instructions.

18. A non-transitory computer-readable medium storing instructions which, when executed by a client, causes the client to:
  initialize a central processing unit (CPU) exception vector table of the client with one or more vector table entries, each of the one or more vector table entries referencing a corresponding event handler that is used to process an exception event, wherein at least one vector table entry directs a CPU of the client to execute a code authentication process, the code authentication process being performed every time an exception event occurs on the client;
  in response to detecting an exception event associated with the at least one vector table entry, execute the code authentication process to authenticate a segment of executable code stored in memory, wherein the code authentication process identifies non-conforming or unauthorized code before the non-conforming or unauthorized code is executed; and
  in response to the code authentication process determining that the segment of executable code is conforming or authorized code, execute an event handler associated with the at least one vector table entry;
  wherein the code authentication process authenticates the segment of executable code by calculating a first hash value for a portion of executable code stored in memory, and then, determining whether the first hash value matches a second hash value read from a table of hash values.

19. The non-transitory computer-readable medium of claim 18, wherein the segment of executable code stored in memory corresponds to boot-loader instructions stored in memory.

20. The non-transitory computer-readable medium of claim 19, storing further instructions which, when executed by the client, cause the client to:
  authenticate the boot-loader instructions stored in the memory prior to executing the boot-loader instructions, wherein the boot-loader instructions, when executed by the CPU, cause the client to i) load an operating system into memory and ii) initialize said CPU exception vector table.

21. The non-transitory computer-readable medium of claim 19, storing further instructions which, when executed by the client, cause the client to:
  verify the integrity of the boot-loader instructions by reading a digital signature for the boot-loader instructions from memory, and
  decrypting the digital signature to obtain the first hash value, and then comparing the first hash value with the second hash value generated by analyzing the boot-loader instructions in memory.

22. The non-transitory computer-readable medium of claim 19, storing further instructions which, when executed by the client, cause the client to:
  prevent the CPU from executing boot-loader instructions until a system integrity authenticator has verified the integrity of the boot-loader instructions.

* * * * *